United States Patent
Parthasarathi et al.

(10) Patent No.: US 10,419,828 B2
(45) Date of Patent: Sep. 17, 2019

(54) MODIFYING SUBTITLES TO REFLECT CHANGES TO AUDIOVISUAL PROGRAMS

(71) Applicant: NETFLIX, INC., Los Gatos, CA (US)

(72) Inventors: Murthy Parthasarathi, San Jose, CA (US); Ghaida Zahran, Oakland, CA (US); Devang Shah, Santa Clara, CA (US); Andrew Swan, San Jose, CA (US); Thomas E. Mack, Los Gatos, CA (US); Kalyan Nistala, Cupertino, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 15/865,173

(22) Filed: Jan. 8, 2018

(65) Prior Publication Data

US 2019/0215580 A1 Jul. 11, 2019

(51) Int. Cl.
*H04N 21/854* (2011.01)
*G06F 17/24* (2006.01)
*H04N 21/488* (2011.01)

(52) U.S. Cl.
CPC ......... *H04N 21/854* (2013.01); *G06F 17/248* (2013.01); *H04N 21/4884* (2013.01)

(58) Field of Classification Search
USPC ................................. 386/239–248, 278–290
See application file for complete search history.

(56) References Cited

U.S. PATENT DOCUMENTS

| | | | |
|---|---|---|---|
| 9,021,536 B2* | 4/2015 | Greenberg ........... | H04N 7/0884 348/423.1 |
| 9,609,397 B1* | 3/2017 | Barreira Avegliano ..................... | H04N 21/8547 |
| 2004/0093220 A1* | 5/2004 | Kirby ..................... | G06F 17/27 704/278 |
| 2015/0071608 A1* | 3/2015 | Ito ........................ | H04N 9/8205 386/244 |
| 2016/0086636 A1* | 3/2016 | Huang .................. | H04N 9/8205 386/241 |
| 2018/0211556 A1* | 7/2018 | Sreedhara .............. | G09B 17/04 |

* cited by examiner

*Primary Examiner* — Hung Q Dang
(74) *Attorney, Agent, or Firm* — Artegis Law Group, LLP (57) ABSTRACT

In various embodiments, a subtitle conformance application causes modifications to a subtitle list based on changes associated with an audiovisual program. In operation, the subtitle conformance application performs comparison operation(s) between versions of a subtitle template to identify changes to subtitles associated with the audiovisual program. The subtitle conformance application then determines a mapping between a first change included in the changes and a subtitle list associated with the audiovisual program. Finally, the subtitle conformance application causes the subtitle list to be modified based on the first change and the mapping. Advantageously, the subtitle conformance application enables productive development of subtitles to begin before the audiovisual program is finalized.

20 Claims, 5 Drawing Sheets

MODIFYING SUBTITLES TO REFLECT CHANGES TO AUDIOVISUAL PROGRAMS

BACKGROUND OF THE INVENTION

Field of the Invention

Embodiments of the present invention relate generally to audiovisual processing and, more specifically, to modifying subtitles to reflect changes to audiovisual programs.

Description of the Related Art

Subtitles enable viewers who suffer from hearing loss or who do not understand the spoken dialog associated with an audiovisual program, such as a feature length film or a television program, to follow the spoken dialog. Because subtitled audiovisual programs are typically released in multiple countries and/or multilingual countries, a given viewer typically selects a particular language for the subtitles associated with the subtitled audiovisual program be watched by the viewer. While the viewer is watching the video component of the audiovisual program on a display screen, the viewer reads the subtitles in the selected language displayed in a subtitle area of the display screen and, accordingly, is able to follow the narrative of the audiovisual program.

To generate the subtitles in a particular language, a professional subtitler typically views the audiovisual program and partitions the spoken dialog based on the verbosity of the particular language and various subtitle constraints, such as maximum reading speed. For each partition of spoken dialog in the audiovisual program, the subtitler generates a corresponding subtitle that defines without limitation, text in the particular language, a start timecode, and an end timecode. The text corresponds to the partition of spoken dialog, while the start timecode and end timecode designate the interval of time during playback of the audiovisual program when the text is displayed.

One drawback of the above approach is that, after the audiovisual program has been finalized, many days of manual effort are required to generate the subtitles. If the subtitlers are unable to generate the subtitles for the supported languages before the audiovisual program is scheduled for release, then the release of the audiovisual program may be delayed. Oftentimes, to avoid delaying the release of the audiovisual program, the subtitlers have to rush their work. As a result, the subtitlers oftentimes make translation errors and other mistakes that reduce the overall quality of the viewing experiences of viewers of audiovisual programs who rely on subtitles.

As the foregoing illustrates, what is needed in the art are more effective techniques for generating subtitles for audiovisual programs.

SUMMARY OF THE INVENTION

One embodiment of the present invention sets forth a computer-implemented method for generating subtitles for audiovisual programs. The method includes performing one or more comparison operations, via a processor, between a first version of a subtitle template and a second version of the subtitle template to identify a plurality of changes associated with an audiovisual program; performing one or more additional operations, via the processor, to determine a mapping between a first change included in the plurality of changes and a subtitle list associated with the audiovisual program; and causing the subtitle list to be modified based on the first change and the mapping to generate an up-to-date subtitle list.

One advantage of the disclosed techniques is that the processor reduces the amount of work performed by subtitlers to generate subtitles. In particular, subtitlers may specify suitable subtitles based on the automatically identified changes without viewing the corresponding partition of the audiovisual program. As a result, the disclosed techniques enable productive development of subtitles to begin before an audiovisual program has been finalized. Consequently, the risk that generating the subtitles delays the release of the audiovisual program may be decreased. Furthermore, increasing the duration over which the subtitles may be effectively developed decreases the likelihood of translation errors and other mistakes that negatively impact the overall quality of the viewing experience of the audiovisual program for viewers that rely on the subtitles.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

The disclosed techniques may be used to efficiently generate subtitles for audiovisual programs. A subtitle template that specifies subtitles in English is developed based on an initial version of an audiovisual program. The subtitle template is used to guide the development of any number of subtitle lists, where each different subtitle list specifies subtitles in a different language. After a new version of the audiovisual program is available, a template conformance application generates a template graphical user interface (GUI) that guides modifications to the subtitle template based on changes between the current and new versions of the audiovisual program. Based on input received via the template GUI, the template conformance application generates a new version of the subtitle template that reflects the new version of the audiovisual program.

After the new version of the subtitle template is available, a subtitle conformance application receives a request to guide updates to one of the subtitle lists. The subtitle conformance application generate a subtitle change list based on differences between the current and new versions of the subtitle template. The subtitle conformance application then determines mappings between the subtitle change list and the subtitle list. Subsequently, the subtitle conformance application generates a subtitle GUI that visually depicts, without limitation, the mappings, the subtitle changes, and the subtitle list. Based on input received via the subtitle GUI, the subtitle conformance application generates a new version of the subtitle list. The new version of the subtitle list conforms to the new version of the subtitle template and, consequently, the new version of the audiovisual program.

Advantageously, the template conformance application and the subtitle conformance application enable an incremental development process that automates much of the work involved in generating subtitles. In particular, the subtitle conformance application enables subtitlers to specify suitable subtitles based on the automatically identified changes without viewing corresponding partitions of the audiovisual program. Accordingly, the subtitle conformance application allows subtitlers to begin productive work on the subtitles before the audiovisual program is finalized. Consequently, the likelihood that generating the subtitles delays the release of the audiovisual program is decreased. Further, by increasing the duration over which the subtitles may be productively developed, each subtitler is less likely to rush their work to avoid delaying the release of the audiovisual program. As a result, the likelihood of translation errors and other mistakes that negatively impact the overall quality of the viewing experience of the audiovisual program for viewers that rely on the subtitles is decreased.

System Overview

Figure 1:
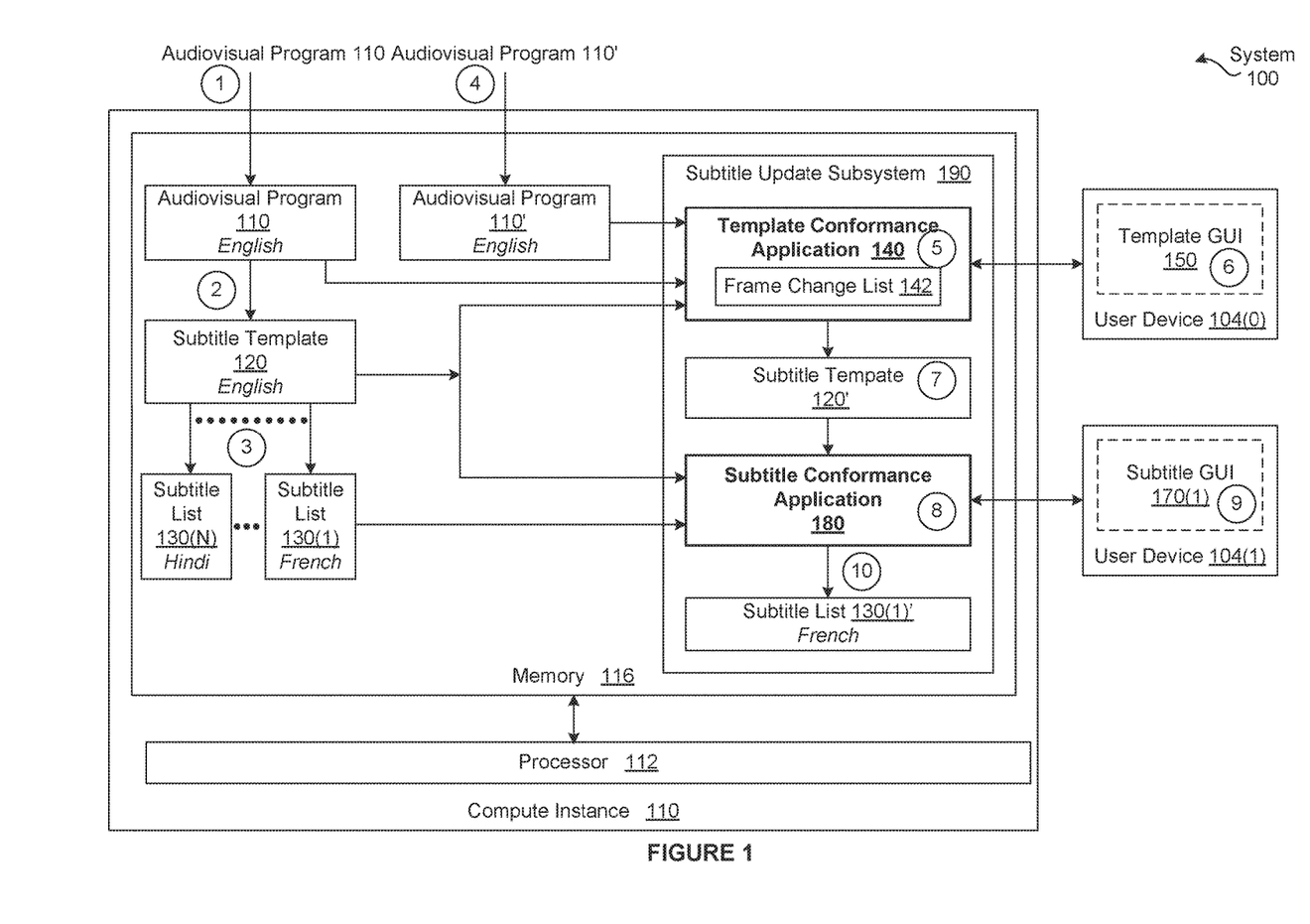
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a compute instance 110 and user devices 104. For explanatory purposes, multiple instances of like objects are denoted with reference numbers identifying the object and parenthetical numbers identifying the instance where needed. Further, a "current" version of an object at one time is distinguished from a "new" version of the object at a subsequent time with a prime symbol (i.e., ') that decorates the reference number. Similarly, a "current" version of an instance at one time is distinguished from a "new" version of the instance at a subsequent time with a prime symbol that decorates the right parenthesis.

In various embodiments, the system 100 may include any number of compute instances 110 and any number of user devices 104 in any combination. Further, although not shown in FIG. 1, the system 100 may include any number of input devices, any number of output devices, and any number of input/output devices. Each of the input, output, and input/output devices may communicate with any number of the compute instances 110 and any number of the user devices 104 in any combination and in any technically feasible fashion. Any number of the components of the system 100 may be distributed across multiple geographic locations or included in one or more cloud computing environments (i.e., encapsulated shared resources, software, data, etc.) in any combination. For example, the compute instance 110 could be located in San Jose, the user device 104(0) could be located in Montreal, and the user device 104(1) could be located in Mumbai.

Each of the user devices 104 may be any type of device that is capable of transmitting input data and/or displaying visual content. For example, the user device 104(0) could comprise a game console, a smartphone, a smart television (TV), a laptop, a tablet, or a desktop computer. Notably, one or more of the user devices 110 may also be compute instances 110.

The compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The processor 112 may receive input via any number of input devices and/or any number of input/output devices. The processor 112 may generate pixels for display via any number of output devices and/or any number of input/output devices. Examples of input devices include, without limitation, a mouse, a keyboard, a microphone, and the like. An example of an input/output device is a touch screen. The output device may be any device capable of displaying images and/or visual content, such as a monitor. Each input device, input/output device, and output device may be a stand-alone device or may be integrated into another device, such as the compute instance 110 or one of the user devices 104.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instance 110 included in the system 100 is configured to implement one or more applications. More specifically, the compute instance 110 included in the system 100 implements applications that perform operations involved in generating subtitles for audiovisual programs 110. Examples of audiovisual programs 110 include feature length files, episodes of television programs, and music videos, to name a few. Each of the user devices 104 is associated with a different user. For explanatory purposes only, a "user" refers to any person that performs operations via one or more of the applications included in the system 100. One example of a user is a subtitler.

Subtitles enable viewers who suffer from hearing loss or who do not understand the spoken dialog associated with an audiovisual program, such as a feature length film or a television program, to follow the spoken dialog. Because subtitled audiovisual programs are typically released in multiple countries and/or multilingual countries, a given viewer typically selects a particular language for the subtitles associated with the subtitled audiovisual program be watched by the viewer. While the viewer is watching the video component of the audiovisual program on a display screen, the viewer reads the subtitles in the selected language displayed in a subtitle area of the display screen and, accordingly, is able to follow the narrative of the audiovisual program.

In a conventional approach to generating subtitles in a particular language, a professional subtitler typically views the audiovisual program and partitions the spoken dialog based on the verbosity of the particular language and various subtitle constraints, such as maximum reading speed. For each partition of spoken dialog in the audiovisual program, the subtitler generates a corresponding subtitle that defines without limitation, text in the particular language, a start timecode, and an end timecode. The text corresponds to the partition of spoken dialog, while the start timecode and end timecode designate the interval of time during playback of the audiovisual program when the text is displayed.

One drawback of the above approach is that many days of manual effort, after the audiovisual program has been finalized, are required to generate the subtitles. If the subtitlers are unable to generate the subtitles for the supported languages before the audiovisual program is scheduled for release, then the release of the audiovisual program may be delayed. Oftentimes, to avoid delaying the release of the audiovisual program, the subtitlers have to rush their work. As a result, the subtitlers oftentimes make translation errors and other mistakes that reduce the overall quality of the viewing experience of audiovisual programs for viewers who rely on subtitles.

Implementing an Incremental Development Process for Generating Subtitles

To decrease the likelihood that generating the subtitles delays the release of the audiovisual program 110 as well as to increase the quality of the subtitles, the computer instance 110 implements a subtitle update subsystem 190 that is stored in the memory 116. The subtitle update system 190 includes, without limitation, a template conformance application 140 and a subtitle conformance application 180. The template conformance application 140 and the subtitle conformance application 180 execute on the processor 112. Together, the template conformance application 140 and the subtitle conformance application 180 enable an efficient incremental development process for generating subtitles that increases the length of time over which productive subtitling operations may be performed.

In an initial phase, the subtitle update subsystem 190 acquires a current version of the audiovisual program 110 and a current version of a subtitle template 120. The current version of the subtitle template 120 is derived from the current version of the audiovisual program. The subtitle template 120 includes, without limitation, any number of subtitles (not shown in FIG. 1). In general, the subtitle template 120 is associated with the primary language of the spoken dialog included in the audiovisual program 110. For explanatory purposes only, the primary language of the spoken dialog included in the audiovisual program 110 is English, so the language that is associated with the subtitle template 120 is English.

In the initial phase, the current version of the subtitle template 120 may be derived form the current version of the audiovisual program 110 in any technically feasible fashion. For example, a user (e.g., a subtitler) could view the audiovisual program 110 and generate the subtitle template 120 manually. Subsequently, for each additional language for which subtitles are supported, the subtitle update subsystem 190 acquires a subtitle list 130 that is associated with the language. As shown, the subtitle list 130(1) is associated with French and the subtitle list 130(N) is associated with Hindi. Each of the subtitle lists 130 is independently derived from the current version of the subtitle template 120 and includes, without limitation, any number of subtitles.

In some embodiments, the subtitle template 120 is equivalent to the subtitle list 130(0) that is associated with the primary language of the spoken dialog included in the audiovisual program 110. In other embodiments, the format of the subtitle template 120 may differ from the format of the subtitle lists 130. The subtitle template 120 and the subtitle lists 130 may be specified in any technically feasible fashion. For instance, in some embodiments, each of the subtitle template 120 and the subtitle lists 130 may comprise a different JavaScript Object Notation (JSON) file.

In the initial phase, for each of the additional supported languages, the current version of the subtitle list 130 associated with the language is derived from the current version of the subtitle template 120 in any technically feasible fashion. For example, a user who is proficient in both English and French could manually translate the subtitles included in the subtitle template 120 to generate the subtitles included in the subtitle list 130(1). Advantageously, the users that generate the subtitle lists 130 associated with the additional languages may not need to view the audiovisual program 110. Further, deriving the subtitle lists 130 from the subtitle template 120 promotes a level of consistency across the subtitles associated with different languages that facilitates the incremental development process for generating subtitles.

In general, as persons skilled in the art will recognize, when translating from one language to another language, the amount of space occupied by the text may contract or expand. For example, when translating English to German, the amount of space occupied by the text typically increases by 10%-35%. Further, subtitles are typically constrained by limitations such as available subtitle display space and maximum reading speed.

Consequently, a particular partition of verbal dialog could be represented by a single subtitle in the subtitle template 120 associated with English, spread across multiple subtitles 220 in the subtitle list 130(2) associated with German, and represented by a single subtitle 220 in the subtitle list 130(3) associated with Norwegian. Conversely, a different partition of verbal dialog could be spread across multiple subtitles 220 in the subtitle template 120 associated with English, spread across multiple subtitles 220 in the subtitle list 130(2) associated with German, and represented by a single subtitle 220 in the subtitle list 130(4) associated with Japanese.

In general, the template conformance application 140 facilitates efficient, incremental updates to the subtitle templates 120 based on differences between versions of the audiovisual program 110. Similarly, for each of the additional supported languages, the subtitle conformance application 180 facilitates efficient, incremental updates to the subtitle list 130 based on differences between versions of the subtitle template 120.

In operation, after a new version of the audiovisual program 110' is available, the template conformance application 140 acquires a frame change list 142. The frame change list 142 describes the frames that differ between the current version of the audiovisual program 110 and the new version of the audiovisual program 110'. Examples of differences that may be specified in the frame change list 142 include, without limitation, frames that have been added to the current version of the audiovisual program 110, frames that have been deleted from the current version of the audiovisual program 110, and frames that have been relocated with respect to the other frames that comprise the audiovisual program 110.

The template conformance application 140 may acquire the frame change list 142 in any technically feasible fashion. For instance, in some embodiments, the template conformance application 140 executes a video differentiation application to obtain the frame change list 142. In other embodiments, the template conformance application 140 implements one or more change detection algorithms that identify differences between the current version of the audiovisual program 110 and the new version of the audiovisual program 110' to determine the frame change list 142.

Subsequently, the template conformance application 140 generates a template GUI 150 based on the frame change list 142. The template conformance application 140 then displays the template GUI 150 to a user via one of the user devices 104. The template GUI 150 facilitates the generation of a new version of the subtitle template 120' that conforms to the new version of the audiovisual program 110'. In various embodiments, instead of generating and displaying a new template GUI 150, the template conformance application 140 may update an existing template GUI 150 to depict the frame change list 142.

In some embodiments, the template conformance application 140 updates the template GUI 150 in two steps. In the first step, the template conformance application 140 generates a notification that a new version of the audiovisual program 110' is available. After receiving a request to guide updates to the subtitle template 120, the template conformance application 150 populates the template GUI 150 based on the frame change list 142. In general, the template conformance application 140 may update the template GUI 150 in response to any number and type of criteria.

The template GUI 150 may provide any number and type of visual components (e.g., interface widgets, search widgets, panels, tabs, etc.) that enable the user to quickly and efficiently modify the current version of the subtitle template 120 to generate the new version of the subtitle template 120'. For instance, in some embodiments, the template GUI 150 may include, without limitation, a video playback pane, an audio pane, and a subtitle pane. The video playback pane enables the user to watch the new version of the audiovisual program 110'. The audio pane enables the user to view wave forms associated with an audio portion of the new version of the audiovisual program 110'. The subtitle pane enables the user to view the current version of the subtitle template 120.

In response to input received via the user device 104 and the subtitle GUI 170, the template conformance application 140 generates the new version of the subtitle template 120'. The new version of the subtitle template 120' conforms to the new version of the audiovisual program 110'. Notably, the template conformance application 140 enables the user to generate the new version of the subtitle template 120' without viewing all of the new version of the audiovisual program 110'. For example, the user could selectively view the frames of the new version of the audiovisual program 110' that are specified in the frame change list 142.

Subsequently, the subtitle conformance application 180 acquires the new version of the subtitle template 120'. The subtitle conformance application 180 may acquire the new version of the subtitle template 120' in any technically feasible fashion. For instance, in some embodiments, the subtitle conformance application 180 receives the new version of the subtitle template 120' from the template conformance application 140. In other embodiments, the subtitle conformance application 180 receives input that specifies a location of the new version of the subtitle template 120'.

After acquiring the new version of the subtitle template 120', the subtitle conformance application 180 generates a notification that a new version of the subtitle template 120' is available. The subtitle conformance application 180 then distributes the notification to one or more users in any technically feasible fashion. For instance, in some embodiments, the subtitle conformance application 180 updates or generates a subtitle graphical user interface (GUI) 170 to depict the notification. The subtitle conformance application 180 then causes one or more of the display devices 104 to refresh or display the subtitle GUI 170. Notably, at any given time, a single instance of the subtitle GUI 170 is associated with a single subtitle list 130.

In some embodiments any number of users may execute any number of instances of the subtitle conformance application 180. In such embodiments, each instance of the subtitle conformance application 180 may display the notification via a different instance of the subtitle GUI 170. Any number of instances of the subtitle conformance application 180 may execute on any number of the compute instances 110 in any combination. Further, the template conformance application 140 and any number (including zero) of instances of the subtitle conformance application 180 may execute on a single compute instance 110. In other embodiments, a single instance of the subtitle conformance application 180 may display the notification via multiple subtitle GUIs 170, where each subtitle GUI 170 is associated with a different subtitle list 130.

Eventually, the subtitle conformance application 180 receives a request to guide updates to one of the subtitle lists 130. The subtitle conformance application 180 may receive the request in any technically feasible fashion. For instance, the subtitle conformance application 180 may receive the request via the subtitle GUI 170. In response to the request, and as described in greater detail in conjunction with FIG. 2, the subtitle conformance application 180 facilitates the generation of a new version of the subtitle list 130'.

In general, the subtitle conformance application 180 analyzes the current version of the subtitle template 120 and the new version of the subtitle template 120' to identify subtitle changes. The subtitle conformance application 180 then generates mappings between the subtitle changes and the current version of the subtitle list 130. The subtitle conformance application 180 generates visual guidance based on the subtitle changes and the mappings. After updating the subtitle GUI 170 to depict the visual guidance, the subtitle conformance application 180 generates the new version of the subtitle list 130 based on user input received via the subtitle GUI 170. The new version of the subtitle list 130' conforms to the new version of the subtitle template 120' and, consequently, the new version of the audiovisual program 110'.

Advantageously, the subtitle conformance application 180 enables a user to efficiently generate the new version of the subtitle template 120' without viewing the new version of the audiovisual program 110'. After generating the new version of the subtitle list 130', the subtitle conformance application 180 sets the current version of the subtitle list 130 equal to the new version of the subtitle list 130'. Subsequently, the subtitle conformance application 180 may receive (and respond to) additional requests to guide updates to other subtitle lists 130.

Prior to acquiring a "newer" version of the audiovisual program 110, the subtitle update subsystem 190 sets the current version of the audiovisual program 110 equal to the new version of the audiovisual program 110' and the current version of the subtitle template 120 equal to the new version of the subtitle template 120'. The subtitle conformance application 180 then repeats the incremental subtitle development process described above.

For explanatory purposes only, FIG. 1 depicts a sequence of operations involved in generating a new version of the subtitle template 120' and a new version of the subtitle list 130(1)' as a series of numbered bubbles. Initially, as depicted with the bubble numbered 1, the subtitle update system 190 acquires the current version of the audiovisual program 110. As depicted with the bubble numbered 2, the subtitle update system 100 acquires the current version of the subtitle template 120 derived from the current version of the audiovisual program 110. As depicted with the bubble numbered 3, for each of the additional supported languages, the subtitle update system 190 acquires the current version of the subtitle list 130.

Eventually, as depicted with the bubble numbered 4, the subtitle update system 190 acquires a new version of the audiovisual program 110'. As depicted with the bubble numbered 5, the template conformance application 140 generates the frame change list 142. After generating the template GUI 150 based on the frame change list 142, the template conformance application 140 causes the user device 104(0) to display the template GUI 150 (bubble number 6). In response to user input received via the template GUI 150 and as depicted with the bubble numbered 7, the template conformance application 140 generates the new version of the subtitle template 120'.

As depicted with the bubble numbered 8, the subtitle conformance application 180 generates the subtitle GUI 170(1) based on the current version of the subtitle template 120, the new version of the subtitle template 120', and the current version of the template list 130(1). Subsequently, as depicted with the bubble numbered 9, the subtitle conformance application 180 displays the subtitle GUI 170(1) via the user device 104(1). In response to user input received via the subtitle GUI 170(1) and as depicted with the bubble numbered 10, the subtitle conformance application 180 generates the new version of the subtitle list 130(1)'.

It will be appreciated that the system 100 shown herein is illustrative and that variations and modifications are possible. For example, the functionality provided by the template conformance application 140 and the subtitle conformance application 180 as described herein may be integrated into or distributed across any number of software applications (including one) and any number of components of the system 100. Further, the connection topology between the various units in the system 100 may be modified as desired.

Note that the techniques described herein are illustrative rather than restrictive, and may be altered without departing from the broader spirit and scope of the invention. For instance, in some embodiments, many modifications and variations will be apparent to those of ordinary skill in the art without departing from the scope and spirit of the described embodiments and techniques.

Conforming Subtitle Lists to Audiovisual Programs

Figure 2:
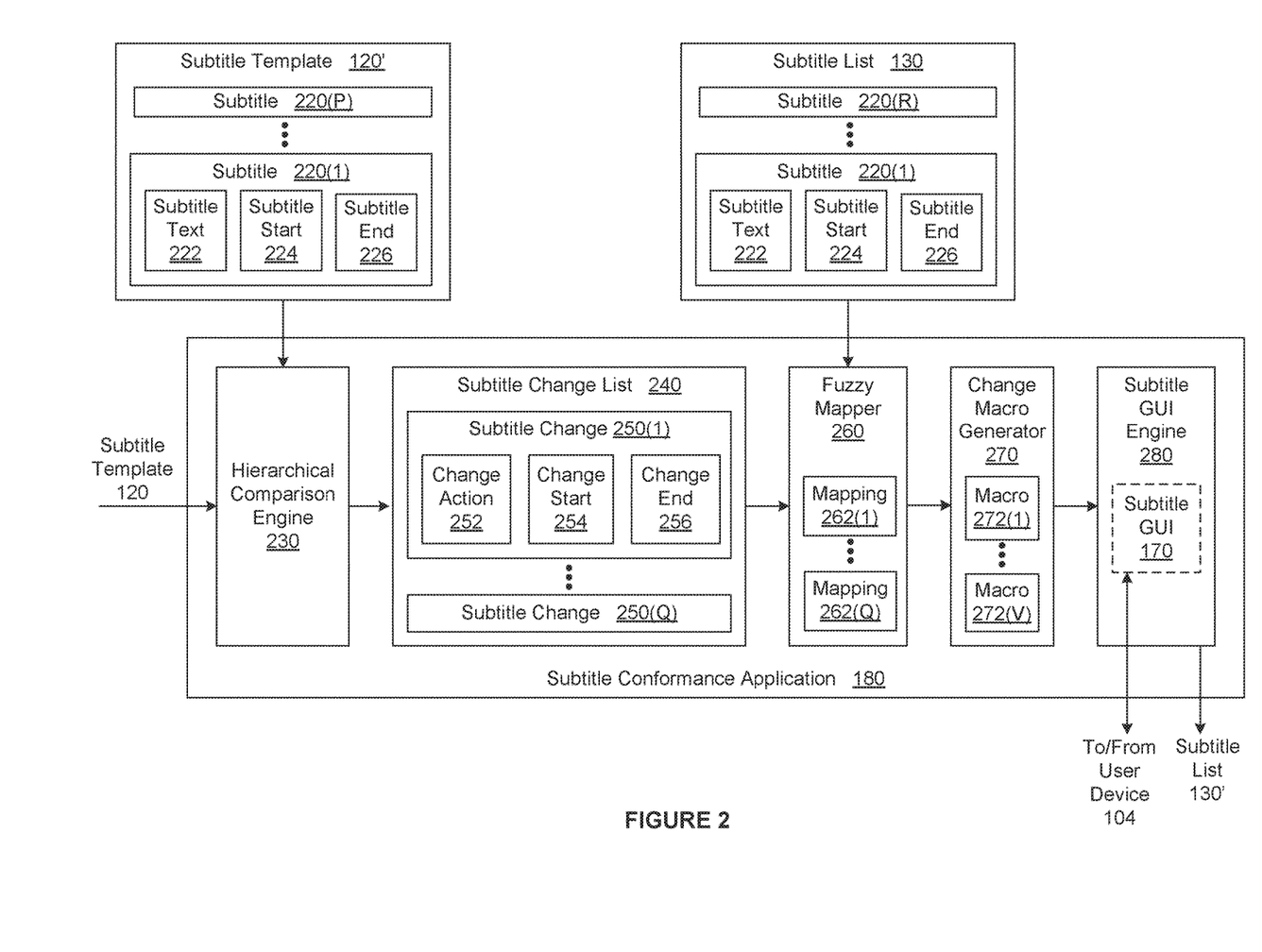
FIG. 2 is a more detailed illustration of the subtitle conformance application of FIG. 1, according to various embodiments of the present invention.

FIG. 2 is a more detailed illustration of the subtitle conformance application 180 of FIG. 1, according to various embodiments of the present invention. As shown, the subtitle conformance application 180 includes, without limitation, a hierarchical comparison engine 230, a fuzzy mapper 250, a change macro generator 270, and a subtitle graphical user interface (GUI) engine 280.

In operation, the subtitle conformance application 180 acquires the current version of the subtitle template 120, a new version of the subtitle template 120', and the current version of the subtitle list 130. The subtitle conformance application 180 may acquire the versions of the subtitle template 120 in any technically feasible fashion. For instance, in some embodiments, if the current version of the subtitle template 120 is not the initial version of the subtitle template 120, then the template conformance application 140 may have previously generated the current version of the subtitle template 120 and, subsequently, the new version of the subtitle template 120'. Similarly, the subtitle conformance application 180 may have previously generated the current version of the subtitle list 130.

Each version of the subtitle template 120 and the subtitle list 130 includes, without limitation, any number of subtitles 220. The number of subtitles 220 included in each version of the subtitle template 120 and the subtitle list 130 may vary. The subtitle template 120 and the subtitles 220 included in the subtitle template 120 are associated with the primary language of the spoken dialog of the audiovisual program 110. By contrast, the subtitle list 130 and the subtitles 220 included in the subtitle list 130 are associated with another language.

As shown, each of the subtitles 220 includes, without limitation, a subtitle text 222, a subtitle start 224, and a subtitle end 226. The subtitle text 222 corresponds to a particular portion of the spoken dialog, while the subtitle start 224 and the subtitle end 226 designate an interval of time during playback of the audiovisual program 110 when the subtitle text 222 is displayed. The subtitle 220 may specify the subtitle start 224 and the subtitle end 226 in any technically feasible format. For instance, in some embodiments, the subtitle start 224 is specified as a start timecode and the subtitle end 226 is specified as an end timecode.

After acquiring the new version of the subtitle template 120', the subtitle conformance application 180 generates a notification that a new version of the subtitle template 120' is available. The subtitle conformance application 180 then displays the notification via the subtitle GUI 170. In alternate embodiments, the subtitle conformance application 180 may display the notification in any technically feasible fashion. In response to the notification, the subtitle conformance application 180 receives a request via the subtitle GUI 170 to guide updates to one of the subtitle lists 130.

The hierarchical comparison engine 230 generates the subtitle change list 240 based on the current version of the subtitle template 120 and the new version of the subtitle template 120'. As shown, the subtitle change list 240 includes, without limitation, any number of subtitle changes 250. Each of the subtitle changes 250 includes, without limitation, a change action 252, a change start 254, and a change end 256. Examples of the change action 252 include, without limitation, an addition of one or more subtitles 220, a deletion of one or more subtitles 220, and a modification of one or more subtitle texts 222, subtitle starts 224, and subtitle ends 226. Together, the change start 254 and the change end 256 define an interval of time or a sequence of frames. The interval of time or sequence of frames encompasses a sequence of subtitles included in the current version of the subtitle template 120 that are associated with the change action 252.

In operation, the hierarchical comparison engine 230 identifies differences between the current version of the subtitle template 120 and the new version of the subtitle template 120' in multiple passes. In a first pass, the hierarchical comparison engine 230 identifies the "bulk" change actions 252 having the largest scope (i.e., that involve the largest number of subtitles 220). In each subsequent pass, the hierarchical comparison engine 230 identifies the change actions 252 having decreasing scopes. In the final pass, the hierarchical comparison engine 230 identifies change actions 252 having scopes of a single subtitle 220.

For example, suppose that one word of the spoken dialog of the current audiovisual program 110 was changed and a one minute title sequence was added to the current audiovisual program 110. In a first pass, the hierarchical comparison engine 230 could identify that all of the subtitles 220 included in the current subtitle template 120 are one minute earlier than the subtitles 220 included in the new version of the subtitle template 120'. In a second pass, the hierarchical comparison engine 230 could identify that the subtitle text 222 of one of the subtitles 220 included in the current version of the subtitle template 120 differs from the subtitle text 222 of the corresponding (offset by 1 minute) subtitle 220 included in the new version of the subtitle template 120.

For each subtitle change 250($x$) included in the subtitle change list 240, the fuzzy mapper 260 determines the mapping 262($x$) that associates the subtitle change 250($x$) with the subtitle list 130. In general, if the change action 252($x$) specifies an addition of a new subtitle 220, then the fuzzy mapper 260 generates the mapping 262($x$) that associates the subtitle change 250($x$) with a time relative to the sequence of frames associated with the subtitle list 130. As referred to herein, the current version of the audiovisual program defines the sequence of frames associated with the current version of the subtitle list 130. Otherwise, the fuzzy mapper 260 generates the mapping 262($x$) that associates the subtitle change 250($x$) with one or more of the subtitles 220 included in the subtitle list 130.

The fuzzy mapper 260 may generate the mapping 262($x$) in any technically feasible fashion. For instance, in some embodiments, the fuzzy mapper 260 determines a fuzzy change interval by subtracting a leeway value (e.g., 0.25 seconds) from the change time start 224($x$) and adding the leeway value to the change time end 226($x$). Subsequently, the fuzzy mapper 260 generates the mapping 262($x$) that associates the subtitle change 250($x$) with the subtitles 220 included in the subtitle list 130 that lie within the fuzzy change interval.

The leeway value enables the fuzzy mapper 260 to properly map the subtitle change 250($x$) associated with one or more subtitles 220 in the current version of the subtitle template 120 to the corresponding subtitle(s) 220 included in the subtitle list 130. As described in conjunction with FIG. 1, when translating from one language to another language, the amount of space occupied by the text may contract or expand. Consequently, the number of subtitles 220 included in the current version of the subtitle template 120 that are associated with a particular subtitle change 250($x$) may differ from the number of corresponding subtitles 220 included in the subtitle list 130 that are associated with the subtitle change 250.

For each subtitle change 250($x$) included in the subtitle change list 240 that includes a non-textual change action 252($x$), the change macro generator 270 generates the macro 272($x$) based on the subtitle change 250($x$) and the associated mapping 262($x$). When executed, the macro 272($x$) modifies the subtitle list 130 to emulate the subtitle change 250($x$). The change macro generator 270 may generate the macro 272($x$) in any technically feasible fashion.

For instance, in some embodiments, the macro generator 270 may generate a script that adds 1 minute to the subtitle start 224($x$) and the subtitle end 226($x$) of the subtitle 220($x$) included in current version of the subtitle list 130. In alternate embodiments, the change macro generator 270 may implement any number and type of heuristics to generate the macro 272 for the subtitle changes 250 associated with any number and type of change actions 252($x$), including textual change actions 252($x$).

In some embodiments, the change macro generator 270 may perform look-up operations to translate at least a portion of a textual substitution specified in the change action 252 to the language associated with the subtitle list 130. For example, suppose that the subtitle template 120 is associated with English and the subtitle list 130 is associated with French. Further, suppose that the mapping 262($x$) maps the subtitle change 250($x$) to all the subtitles 220 in the subtitle list 130, and the change action 252($x$) specifies that the name "Matthew" is to be replaced with the name "Noah." The change macro generator 270 could look up the names "Matthew" and "Noah" in a translation database, and generate the macro 272 that, for all the subtitles 220 included in the subtitle list 130, modifies the subtitle text 222 to replace "Matias" with "Noah."

The subtitle GUI engine 280 generates or updates the subtitle GUI 170 to facilitate the generation of a new version of the subtitle list 130' that conforms to the new version of the subtitle template 120'. The subtitle GUI engine 280 may facilitate the development of the new version of the subtitle list 130 in any technically feasible fashion. For instance, in some embodiments, the subtitle GUI engine 280 may generate the subtitle GUI 170 that includes any number and combination of the current version of the audiovisual program 110, the new version of the audiovisual program 110', the subtitle list 170, the subtitle changes 250, the current version of the subtitle template 120, the new version of the subtitle template 120', the mappings 262, and the macros 272. Further, the subtitle GUI engine 280 may generate any type and amount of visual guidance based on any available information, such as the subtitle changes 250 and the mappings 282. The subtitle GUI engine 280 may then include visual guidance in the subtitle GUI 170 to facilitate the development of the new version of the subtitle list 130. The subtitle GUI engine 280 may generate the visual guidance in any technically feasible fashion.

Figure 3:
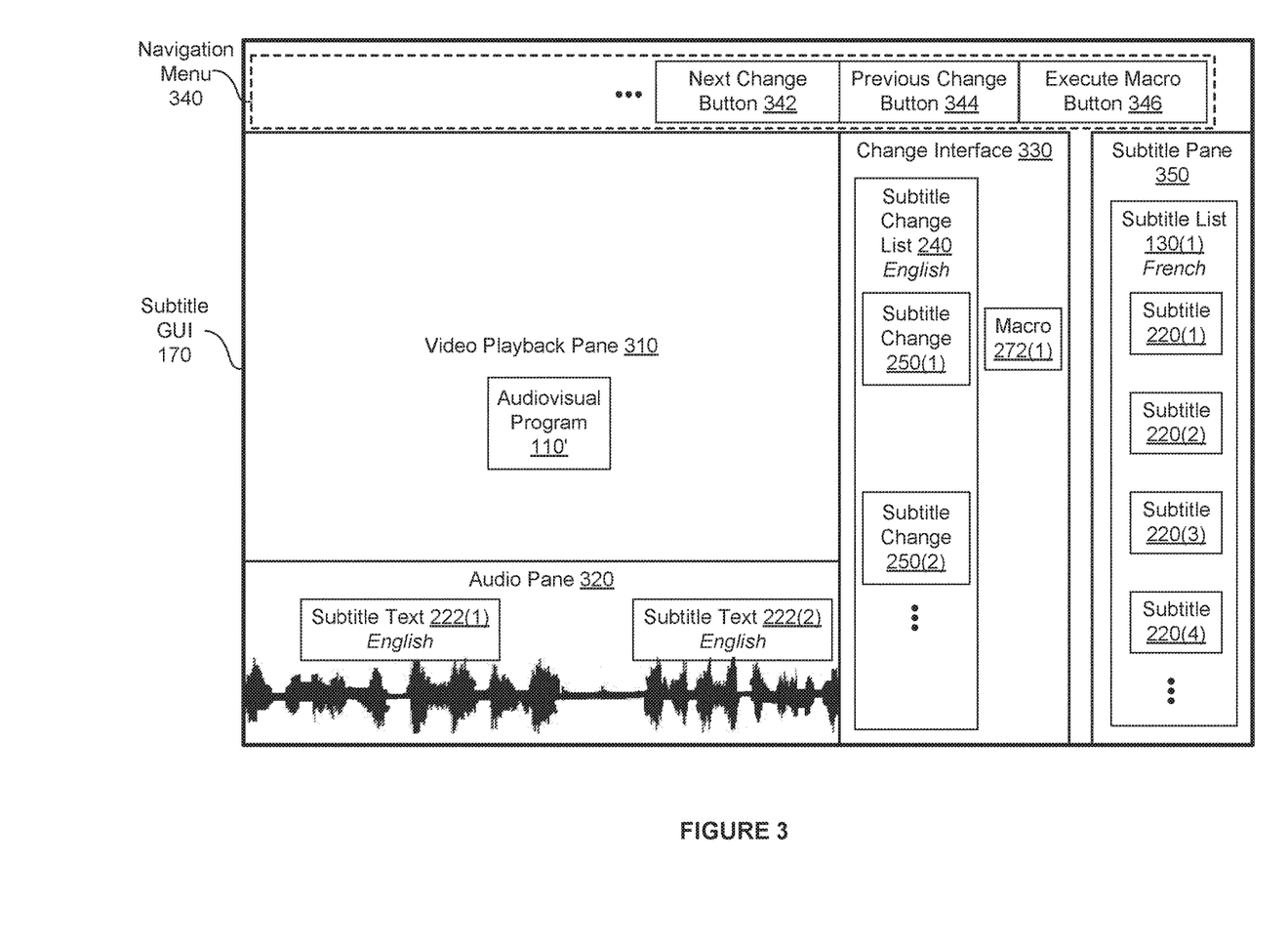
FIG. 3 is a more detailed illustration of the subtitle graphical user interface (GUI) of FIG. 1, according to various embodiments of the present invention.

For example, if the subtitle change 250($x$) includes the change action 252 specifying the addition of a new subtitle 220 at a time of 10 minutes, then the subtitle GUI engine 280 may include a placeholder for a new subtitle 220 at a time of 10 minutes in a displayed subtitle list 130. In another example, to visually illustrate the mapping 252($x$), the subtitle GUI engine 280 may horizontally align the subtitle change 240($x$) displayed in the change interface 330 with the associated subtitles 220 included in the subtitle list 170.

The subtitle GUI engine 280 generates a new version of the subtitle list 130' based on input received via the subtitle GUI 170. Any amount and type of input may be received via the subtitle GUI 170. For example, a user may enter a new subtitle 220, partition an existing subtitle 220 into multiple subtitles 220, change the subtitle text 222, the subtitle start 224, and/or the subtitle end 226 of an existing subtitle 220, delete an existing subtitle 220, and so forth. Further, the user may execute any number of the macros 272, thereby causing modifications to the current version of the subtitle list 130.

Advantageously, the subtitle GUI 170 facilitates the efficient and accurate generation of the new version of the subtitle list 130' that conforms to the new version of the subtitle template 120'. Further, because the new version of the subtitle template 120' conforms to the new version of the audiovisual program 110', the new version of the subtitle list 130' conforms to the new version of the audiovisual program 110'. Accordingly, the template update subsystem 190 enables an incremental development process for generating subtitles.

After generating the new version of the subtitle list 130', the subtitle conformance application 180 sets the current version of the subtitle list 130 equal to the new version of the subtitle list 130'. The subtitle conformance application 180 then determines whether the subtitle GUI engine 280 has received a request to guides updates to a different subtitle list 130. If, the subtitle conformance application 180 determines that the subtitle GUI engine 280 has received a request to guide updates to a different subtitle list 130, then the hierarchical comparison engine 230 generates a new subtitle change list 240.

Prior to acquiring a newer version of the audiovisual program 110', the subtitle update subsystem 190 sets the current version of the audiovisual program 110 equal to the new version of the audiovisual program 110' and the current version of the subtitle list 130 equal to the new version of the subtitle list 130'. After the subtitle update system 190 processes the final version of the audiovisual program 110, the current version of the subtitle template 120 and the current versions of the subtitle lists 130 conform with the final version of the audiovisual program 110.

It will be appreciated that the subtitle conformance application 180 shown herein is illustrative and that variations and modifications are possible. For example the functionality provided by the hierarchical comparison engine 230, the fuzzy mapper 250, the change macro generator 270, and the subtitle graphical user interface (GUI) engine 280 as described herein may be integrated into or distributed across any number of software applications (including one) and any number of components of the system 100.

Note that the techniques described herein are illustrative rather than restrictive, and may be altered without departing from the broader spirit and scope of the invention. For instance, in some embodiments, many modifications and variations will be apparent to those of ordinary skill in the art without departing from the scope and spirit of the described embodiments and techniques. As a general matter, the techniques outlined herein are applicable to incrementally generating the subtitles for one language based on changes to the subtitles for another language.

FIG. 3 is a more detailed illustration of the subtitle graphical user interface (GUI) 170 of FIG. 1, according to various embodiments of the present invention. As shown, the subtitle GUI 170 includes, without limitation, a subtitle pane 350, a change interface 330, a navigation menu 340, a video playback pane 310, and an audio pane 320. In alternate embodiments, the subtitle GUI 170 may include any number and type of visual components (e.g., interface widgets, search widgets, panels, tabs, buttons, menus, etc.) that enable the user to incrementally generate a subtitle list 130 that conforms to a final version of the audiovisual program 110.

As shown, the subtitle pane 350 displays, without limitation, any number of the subtitles 220 included in the current version of the subtitle list 130(1). The subtitle list 130(1) is associated with French, consequently the subtitle texts 222 displayed in the subtitle pane 350 are in French. In a complementary fashion, the change interface 330 displays, without limitation, any number of the subtitle changes 250 included in the subtitle change list 240. In addition, the change interface 330 displays any number of the macros 272. The subtitle change list 240 is derived from the current version of the subtitle template 120 and the new version of the subtitle template 120'. Because the subtitle template 120 is associated with English, the subtitle texts 222 depicted in the change interface 330 are in English. In general, the subtitle GUI engine 280 aligns the subtitle changes 250 displayed via the change interface 330 to the subtitles 222 displayed via the subtitle pane 350 based on the mappings 262.

More precisely, because the mapping 262(1) (not shown in FIG. 3) associates the subtitle change 250(1) with the subtitle 220(1) included in the subtitle list 130(1), the subtitle GUI engine 280 horizontally aligns the subtitle change 250(1) to the subtitle 220(1). Further, because the subtitle change 250(1) specifies a non-textual change action 252(1), the change interface 330 includes the macro 272(1) that automatically modifies the subtitle list 130 to conform with the subtitle change 250(1). For example, if the change action 252(1) is a subtitle deletion, then the macro 272(1), when executed, deletes the subtitle 220(1) from the subtitle list 130(1).

Since the mapping 262(2) (not shown in FIG. 3) associates the subtitle change 250(2) with the subtitle 220(3) included in the subtitle list 130(1), the subtitle GUI engine 280 horizontally aligns the subtitle change 250(2) to the subtitle 220(3). Because the subtitle change 250(2) specifies a textual change action 252(2), no corresponding macro 272 exists. In various embodiments, the subtitle GUI engine 280 may configure the change interface 330 to provide visual guidance to facilitate the proper changes to the subtitle 220(3). For instance, in some embodiments, as part of visually depicting the subtitle change 250(2), the subtitle GUI engine 280 may highlight new subtitle text 222(2) in green and highlight deleted subtitle text 222(2) in red.

The navigation menu 340 includes, without limitation, a next change button 342, a previous change button 344, and an execute macro button 346. The next change button 342 selects the next subtitle change 250 included in the subtitle change list 240. The previous change button 344 selects the previous subtitle change 250 included in the subtitle change list 240. The execute macro button 346 executes the macro 272 associated with the currently selected subtitle change 250. In alternate embodiments, the navigation menu 340 may include any number of widgets that aid in navigating the subtitle pane 350, the change interface 330, the video playback pane 310, and the audio pane 320. For instance, in some embodiments, the navigation menu 340 may include filtering mechanisms. In the same or other embodiments, the navigation menu 340 may include an accept change button that executes operations corresponding to the selected subtitle change 350 on the subtitle list 130.

The video playback pane 310 allows playback of the new version of the audiovisual program 110'. In a complementary fashion, the audio pane 320 depicts wave forms corresponding to the audio portion of the new version of the audiovisual program 110'. The wave forms are annotated with the subtitle texts 222 included in the new version of the subtitle template 120'. Because the subtitle template 120' is associated with English, the subtitle texts 222 depicted in the audio pane 320 are also in English.

Figure 4A:
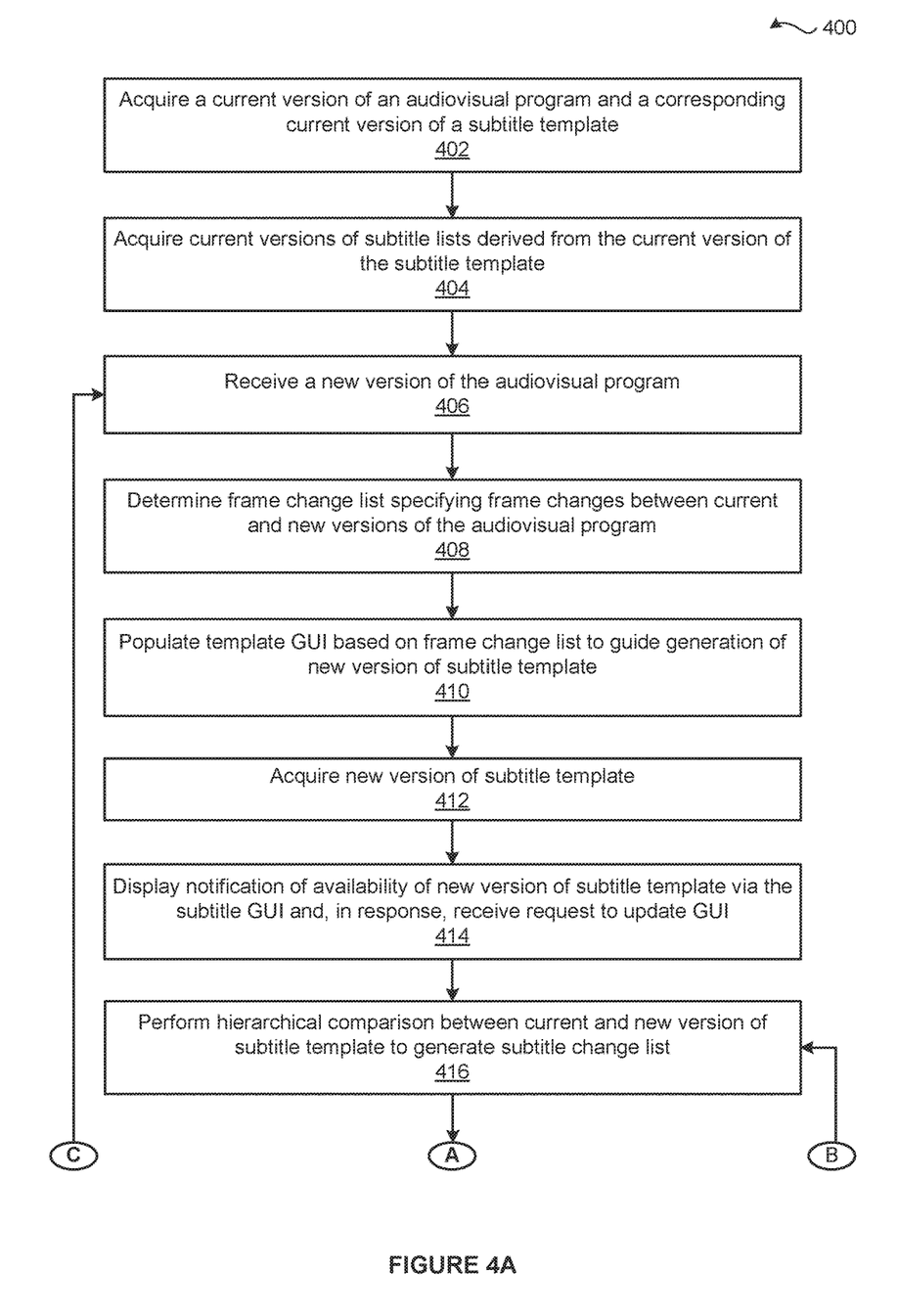
FIGS. 4A-4B set forth a flow diagram of method steps for generating subtitles for an audiovisual program, according to various embodiments of the present invention.
Figure 4B:
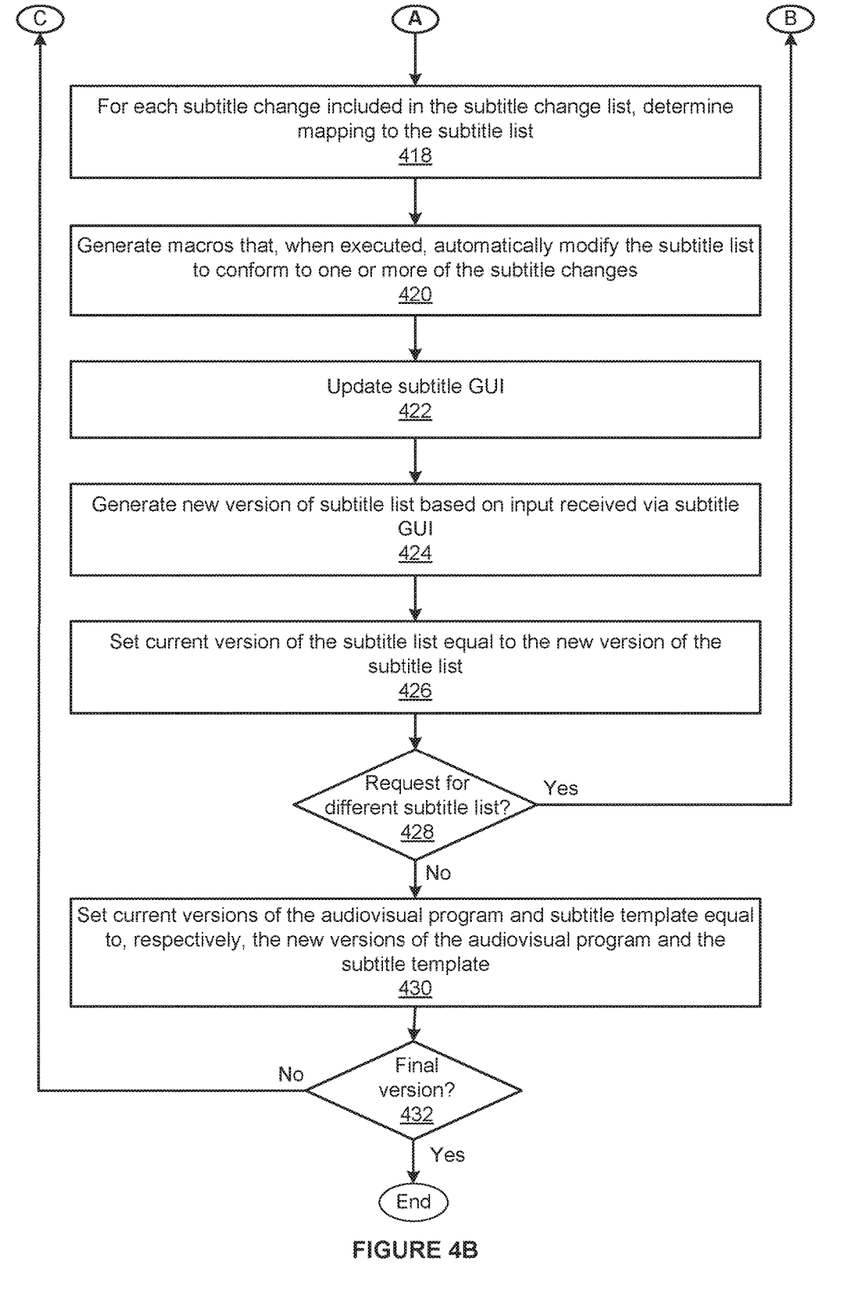

FIGS. 4A-4B set forth a flow diagram of method steps for generating subtitles for an audiovisual program, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the subtitle update subsystem 190 acquires a current version of the audiovisual program 110 and a corresponding current version of the subtitle template 120. The subtitle update subsystem 190 may acquire the current version of the audiovisual program 110 and the corresponding current version of the subtitle template 120 in any technically feasible fashion. For instance, initially, the subtitle update subsystem 190 may read the current version of the audiovisual program 110 and the current version of the subtitle template 120 from a program database.

At step 404, the subtitle update subsystem 190 acquires current version(s) of the subtitle lists 130(1)-130(N), where each of the subtitle lists 130 is associated with a different language. Note that, in various embodiments, the subtitle template 120 is equivalent to the subtitle list 130(0) that is associated with the primary language of the spoken dialog included in the audiovisual program 110. For instance, in some embodiments, if the primary language of the spoken dialog included in the audiovisual program 110 is English, then the subtitle template 120 comprises the subtitle list 130(0) that is associated with English.

At step 406, the subtitle update subsystem 190 receives a new version of the audiovisual program 110'. At step 408, the template conformance application 140 acquires the frame change list 142. The frame change list 142 describes the frames that differ between the current version of the audiovisual program 110 and the new version of the audiovisual program 110'.

The template conformance application 140 may acquire the frame change list 142 in any technically feasible fashion. For instance, in some embodiments, the template conformance application 140 executes a video differentiation application to obtain the frame change list 142. In other embodiments, the template conformance application 140 implements one or more change detection algorithms that identify differences between the audiovisual program 110 and the audiovisual program 110'.

At step 410, the template conformance application 140 populates the template GUI 150 based on the frame change list 142 to guide the generation of a new version of the subtitle template 120'. In general, the template GUI 150 facilitates updates to the current version of the subtitle template 120 to generate the new version of the subtitle template 120' that corresponds to the audiovisual program 110'. To populate the template GUI 150, the template conformance application 140 may update an existing template GUI 150 to depict the frame change list 142. Alternately, the template GUI 150 may generate a new template GUI 150 that depicts, without limitation, the frame change list 142.

At step 412, the subtitle conformance application 180 acquires the new version of the subtitle template 120'. The subtitle conformance application 180 may acquire the new version of the subtitle template 120' in any technically feasible fashion. For instance, in some embodiments, the subtitle conformance application 180 receives the new version of the subtitle template 120' from the template conformance application 140. In other embodiments, the subtitle conformance application 180 receives input that specifies a location of the new version of the subtitle template 120'.

At step 414, the subtitle conformance application 180 displays a notification that a new version of the subtitle template 120' is available. The subtitle conformance application 180 may display the notification in any technically feasible fashion. For instance, in some embodiments, for each supported language, a user may execute a difference instance of the subtitle conformance application 180 as part of developing the subtitle list 130 associated with the language. In such embodiments, each instance of the subtitle conformance application 180 may display a notification via the corresponding subtitle GUI 170. In other embodiments, the subtitle conformance application 180 may display a notification via multiple subtitle GUIs 170, where each subtitle GUI 170 is associated with a different subtitle list 130. In response to the notification, the subtitle conformance application 180 receives a request via the subtitle GUI 170 to guide updates to one of the subtitle lists 130.

At step 416, the hierarchical comparison engine 230 performs a hierarchical comparison between the current version of the subtitle template 120 and the new version of the subtitle template 120' to generate the subtitle change list 240. Some examples of hierarchical comparison operations are described in conjunction with FIG. 2. At step 418, for each subtitle change 250(x) included in the subtitle change list 240, the fuzzy mapper 260 determines the mapping 262(x) that associates the subtitle change 250(x) with the subtitle list 130. The fuzzy mapper 260 may determine the mapping 262 in any technically feasible fashion.

For instance, in some embodiments, the fuzzy mapper 260 determines a fuzzy change interval by subtracting a leeway value (e.g., 0.25 seconds) from the change time start 224(x) and adding the leeway value to the change time end 226(x). Subsequently, the fuzzy mapper 260 generates the mapping 262(x) that associates the subtitle change 250(x) with the subtitles 220 included in the subtitle list 130 that lie within the fuzzy change interval. The leeway value enables the fuzzy mapper 260 to properly map the subtitle change 250(x) associated with one or more subtitles 220 in the current version of the subtitle template 120 to the corresponding subtitle(s) 220 included in the subtitle list 130.

At step 420, for each subtitle change 250(x) included in the subtitle change list 240 that includes a non-textual change action 252(x), the change macro generator 270 generates the macro 272(x) based on the subtitle change 250(x) and the associated mapping 262(x). When executed, the macro 272(x) modifies the subtitle list 130 to emulate the subtitle change 250(x). The change macro generator 270 may generate the macros 272 in any technically feasible fashion.

At step 422, the subtitle GUI engine 280 generates or updates the subtitle GUI 170 to facilitate the generation of a new version of the subtitle list 130' that conforms to the new version of the subtitle template 120'. The subtitle GUI engine 280 generate or update the subtitle GUI 170 in any technically feasible fashion. For instance, the subtitle GUI engine 280 may generate the subtitle GUI 170 that includes any number and combination of the current version of the audiovisual program 110, the new version of the audiovisual program 110', the subtitle list 170, the subtitle changes 250, the current version of the subtitle template 120, the new version of the subtitle template 120', the mappings 262, and the macros 272. Further, the subtitle GUI engine 280 may generate include amount of visual guidance that is included in the subtitle GUI 170 to guide the development of the new version of the subtitle list 130'.

At step 424, the subtitle GUI engine 280 generates a new version of the subtitle list 130' based on input received via the subtitle GUI 170. Any amount and type of input may be received via the subtitle GUI 170. For example, a user may enter a new subtitle 220, partition an existing subtitle 220 into multiple subtitles 220, change the subtitle text 222, the subtitle start 224, and/or the subtitle end 226 of an existing subtitle 220, delete an existing subtitle 220, and so forth. Further, the user may execute any number of the macros 272, thereby causing modifications to the current version of the subtitle list 130.

Advantageously, the subtitle GUI 170 facilitates the efficient and accurate generation of the new version of the subtitle list 130' that conforms to the new version of the subtitle template 120'. Further, because the new version of the subtitle template 120' conforms to the new version of the audiovisual program 110', the new version of the subtitle list 130' conforms to the new version of the audiovisual program 110'. Accordingly, the template update subsystem 190 enables an incremental development process for generating subtitles.

At step 426, the subtitle conformance application 180 sets the current version of the subtitle list 130 equal to the new version of the subtitle list 130'. At step 428, the subtitle conformance application 180 determines whether the subtitle GUI engine 280 has received a request to guide updates to a different subtitle list 130. If, at step 428, the subtitle conformance application 180 determines that the subtitle GUI engine 280 has received a request to guide updates to a different subtitle list 130, then the method 400 returns to step 416, where the hierarchical comparison engine 230 generates a new subtitle change list 240.

If, however, at step 428, the subtitle conformance application 180 determines that the subtitle GUI engine 280 has not received a request to guide updates to a different subtitle list 130, then the method 400 proceeds to step 430. At step 430, the subtitle conformance application 180 sets the current version of the audiovisual program 110 equal to the new version of the audiovisual program 110' and the current version of the subtitle list 130 equal to the new version of the subtitle list 130'.

At step 432, the subtitle update subsystem 190 determines whether the current version of the audiovisual program 110 is the final version of the audiovisual program 110. If, at step 428, the subtitle update subsystem 190 determines that the current version of the audiovisual program 110 is not the final version of the audiovisual program 110, then the method 400 returns to step 406, where the subtitle update subsystem 190 receives a new version of the audiovisual program 110'.

If, however, at step 430, the subtitle update subsystem 190 determines that the current version of the audiovisual program 110 is the final version of the audiovisual program 110, then the method 400 terminates. When the method 400 terminates, the current version of the subtitle template 120 and the current versions of the subtitle lists 130 conform with the final version of the audiovisual program 110.

In sum, the disclosed techniques may be used to generate subtitles for audiovisual programs. A subtitle template that specifies subtitles in English is developed based on an initial version of an audiovisual program. The subtitle template is used to guide the development of any number of subtitle lists, where each different subtitle list specifies subtitles in a different language. After a new version of the audiovisual program is available, a template conformance application generates visual guidance based on changes between the current and new versions of the audiovisual program. The template conformance application generates a template graphical user interface (GUI) that includes the visual guidance. Based on input received in response to the visual guidance, the template conformance application generates a new version of the subtitle template that conforms to the new version of the audiovisual program.

After the new version of the subtitle template is available, a subtitle conformance application receives a request to guide updates to one of the subtitle lists. The subtitle conformance application performs a hierarchical comparison between the current and new versions of the subtitle template to generate a subtitle change list. The subtitle conformance application then performs fuzzy time-based comparisons to generate mappings of subtitle changes included the subtitle change list to the subtitle list. Subsequently, the subtitle conformance application generates one or more macros. Each macro, when executed, automatically modifies the subtitle list based on a corresponding subtitle change. In addition, the subtitle conformance application generates visual guidance based on the mappings and the subtitle changes. Finally, the subtitle conformance application generates the subtitle GUI that depicts, without limitation, the visual guidance, the subtitle list, and the macros. Based on input (including any macro execution commands) received via the subtitle GUI, the subtitle conformance application generates a new version of the subtitle list. The new version of the subtitle list conforms to the new version of the subtitle template and, consequently, the new version of the audiovisual program.

Advantageously, the template conformance application and the subtitle conformance application enable an incremental development process that automates much of the work involved in generating subtitles. Unlike conventional approaches to subtitle generation, each user does not need to view the entire finalized audiovisual program to generate accurate subtitles. By starting the subtitle development process before the audiovisual program is finalized, the likelihood that subtitle generation delays the release of the audiovisual program is decreased. Further, by increasing the duration over which the subtitles may be productively developed, each user is less likely to make translation errors and other mistakes that negatively impact the overall quality of the viewing experience of the audiovisual program for viewers that rely on the subtitles.

1. In some embodiments, a computer-implemented method comprises performing one or more comparison operations, via a processor, between a first version of a subtitle template and a second version of the subtitle template to identify a plurality of changes associated with an audiovisual program; performing one or more additional operations, via the processor, to determine a mapping between a first change included in the plurality of changes and a subtitle list associated with the audiovisual program; and causing the subtitle list to be modified based on the first change and the mapping to generate an up-to-date subtitle list.

2. The computer-implemented method of clause 1, wherein performing the one or more comparison operations comprises performing at least a first comparison operation between the first version of the subtitle template and the second version of the subtitle template to identify a bulk change associated with a first plurality of subtitles specified in the first version of the subtitle template and a second plurality of subtitles specified in the second version of the subtitle template; and performing at least a second comparison operation between the first plurality of subtitles and the second plurality of subtitles to identify the first change.

3. The computer-implemented method of clauses 1 or 2, wherein performing the one or more additional operations to determine the mapping comprises performing one or more comparison operations to determine that a first time associated with a first subtitle included in the subtitle list lies within a time interval associated with the first change; and associating the first change with the first subtitle.

4. The computer-implemented method of any of clauses 1-3, wherein the first change specifies at least one of a deletion of a subtitle, a change in a start time associated with a subtitle, a change in an end time associated with a subtitle, a change in text associated with a subtitle, and an addition of a subtitle.

5. The computer-implemented method of any of clauses 1-4, wherein the subtitle template is associated with a first language, and the subtitle list is associated with a second language.

6. The computer-implemented method of any of clauses 1-5, wherein causing the subtitle list to be modified comprises generating visual guidance based on the first change and the mapping, and generating a graphical user interface that includes the visual guidance.

7. The computer-implemented method of any of clauses 1-6, wherein the visual guidance depicts the first change relative to at least a portion of the subtitle list.

8. The computer-implemented method of any of clauses 1-7, further comprising generating the second version of the subtitle template based on a first version of the audiovisual program and a second version of the audiovisual program.

9. The computer-implemented method of any of clauses 1-8, further comprising generating a notification that the second version of the subtitle template is available.

10. In some embodiments, a computer-readable storage medium includes instructions that, when executed by a processor, cause the processor to perform the steps of performing one or more comparison operations between a first version of a subtitle template and a second version of the subtitle template to identify a plurality of subtitle changes, wherein the first version of the subtitle template is associated with a first version of an audiovisual program and the second version of the subtitle template is associated with a second version of the audiovisual program; performing one or more additional operations to determine a mapping between a first change included in the plurality of subtitle changes and a subtitle list associated with the first version of the audiovisual program; and causing the subtitle list to be modified based on the first change and the mapping to generate an up-to-date subtitle list that is associated with the second version of the audiovisual program.

11. The computer-readable storage medium of clause 10, further comprising, prior to performing the one or more comparison operations: comparing the first version of the audiovisual program and the second version of the audiovisual program to determine one or more frame changes; and causing the first version of the subtitle template to be modified based on the one or more frame changes to generate the second version of the subtitle template.

12. The computer-readable storage medium of clauses 10 or 11, wherein the mapping associates the first change with a first time relative to a sequence of frames associated with the first version of the subtitle template.

13. The computer-readable storage medium of any of clauses 10-12, wherein causing the subtitle list to be modified comprises generating a macro that, when executed, causes the subtitle list to be modified based on the first change and the mapping; generating a graphical user interface that includes the macro; and executing the macro in response to input received via the graphical user interface.

14. The computer-readable storage medium of any of clauses 10-13, wherein performing the one or more comparison operations comprises performing at least a first comparison operation between the first version of the subtitle template and the second version of the subtitle template to identify a bulk change associated with a first plurality of subtitles specified in the first version of the subtitle template and a second plurality of subtitles specified in the second version of the subtitle template; and performing at least a second comparison operation between the first plurality of subtitles and the second plurality of subtitles to identify the first change.

15. The computer-readable storage medium of any of clauses 10-14, wherein performing the one or more additional operations to determine the mapping comprises performing one or more comparison operations to determine that a first time associated with a first subtitle included in the subtitle list lies within a time interval associated with the first change; and associating the first change with the first subtitle.

16. The computer-readable storage medium of any of clauses 10-15, wherein the first change specifies at least one of a deletion of a subtitle, a change in a start time associated with a subtitle, a change in an end time associated with a subtitle, a change in text associated with a subtitle, and an addition of a subtitle.

17. The computer-readable storage medium of any of clauses 10-16, wherein the subtitle template is associated with a first language and the subtitle list is associated with a second language.

18. The computer-readable storage medium of any of clauses 10-17, wherein causing the subtitle list to be modified comprises generating visual guidance based on the first change and the mapping, and generating a graphical user interface that includes the visual guidance.

19. In some embodiments, a system comprises a memory storing instructions; and a processor that is coupled to the memory and, when executing the instructions, is configured to compare a first version of a subtitle template and a second version of the subtitle template to identify a plurality of changes associated with an audiovisual program; identify a first subtitle that is associated with a first change included in the plurality of changes, wherein the first subtitle is included in a subtitle list; and cause the subtitle list to be modified based on the first change and the first subtitle to generate an up-to-date subtitle list.

20. The system of clause 19, wherein the processor is further configured to compare a first version of the audiovisual program and a second version of the audiovisual program to determine one or more frame changes; and cause the first version of the subtitle template to be modified based on the one or more frame changes to generate the second version of the subtitle template.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    performing one or more comparison operations, via a processor, between a first version of a subtitle template and a second version of the subtitle template to identify a plurality of changes associated with an audiovisual program;
    performing one or more additional operations, via the processor, to determine a mapping between a first change included in the plurality of changes and a subtitle list associated with the audiovisual program; and
    causing the subtitle list to be modified based on the first change and the mapping to generate an up-to-date subtitle list.

2. The computer-implemented method of claim 1, wherein performing the one or more comparison operations comprises:
    performing at least a first comparison operation between the first version of the subtitle template and the second version of the subtitle template to identify a bulk change associated with a first plurality of subtitles specified in the first version of the subtitle template and a second plurality of subtitles specified in the second version of the subtitle template; and
    performing at least a second comparison operation between the first plurality of subtitles and the second plurality of subtitles to identify the first change.

3. The computer-implemented method of claim 1, wherein performing the one or more additional operations to determine the mapping comprises:
    performing one or more comparison operations to determine that a first time associated with a first subtitle included in the subtitle list lies within a time interval associated with the first change; and
    associating the first change with the first subtitle.

4. The computer-implemented method of claim 1, wherein the first change specifies at least one of a deletion of a subtitle, a change in a start time associated with a subtitle, a change in an end time associated with a subtitle, a change in text associated with a subtitle, and an addition of a subtitle.

5. The computer-implemented method of claim 1, wherein the subtitle template is associated with a first language, and the subtitle list is associated with a second language.

6. The computer-implemented method of claim 1, wherein causing the subtitle list to be modified comprises generating visual guidance based on the first change and the mapping, and generating a graphical user interface that includes the visual guidance.

7. The computer-implemented method of claim 6, wherein the visual guidance depicts the first change relative to at least a portion of the subtitle list.

8. The computer-implemented method of claim 1, further comprising generating the second version of the subtitle template based on a first version of the audiovisual program and a second version of the audiovisual program.

9. The computer-implemented method of claim 8, further comprising generating a notification that the second version of the subtitle template is available.

10. A non-transitory computer-readable storage medium including instructions that, when executed by a processor, cause the processor to perform the steps of:
    performing one or more comparison operations between a first version of a subtitle template and a second version of the subtitle template to identify a plurality of subtitle changes associated with an audiovisual program;

performing one or more additional operations to determine a mapping between a first change included in the plurality of subtitle changes and a subtitle list associated with the audiovisual program; and causing the subtitle list to be modified based on the first change and the mapping to generate an up-to-date subtitle list that is associated with the audiovisual program.

11. The non-transitory computer-readable storage medium of claim 10, further comprising, prior to performing the one or more comparison operations:

comparing a first version of the audiovisual program and a second version of the audiovisual program to determine one or more frame changes; and causing the first version of the subtitle template to be modified based on the one or more frame changes to generate the second version of the subtitle template.

12. The non-transitory computer-readable storage medium of claim 10, wherein the mapping associates the first change with a first time relative to a sequence of frames associated with the first version of the subtitle template.

13. The non-transitory computer-readable storage medium of claim 10, wherein causing the subtitle list to be modified comprises:

generating a macro that, when executed, causes the subtitle list to be modified based on the first change and the mapping;

generating a graphical user interface that includes the macro; and executing the macro in response to input received via the graphical user interface.

14. The non-transitory computer-readable storage medium of claim 10, wherein performing the one or more comparison operations comprises:

performing at least a first comparison operation between the first version of the subtitle template and the second version of the subtitle template to identify a bulk change associated with a first plurality of subtitles specified in the first version of the subtitle template and a second plurality of subtitles specified in the second version of the subtitle template; and performing at least a second comparison operation between the first plurality of subtitles and the second plurality of subtitles to identify the first change.

15. The non-transitory computer-readable storage medium of claim 10, wherein performing the one or more additional operations to determine the mapping comprises:

performing one or more comparison operations to determine that a first time associated with a first subtitle included in the subtitle list lies within a time interval associated with the first change; and associating the first change with the first subtitle.

16. The non-transitory computer-readable storage medium of claim 10, wherein the first change specifies at least one of a deletion of a subtitle, a change in a start time associated with a subtitle, a change in an end time associated with a subtitle, a change in text associated with a subtitle, and an addition of a subtitle.

17. The non-transitory computer-readable storage medium of claim 10, wherein the subtitle template is associated with a first language and the subtitle list is associated with a second language.

18. The non-transitory computer-readable storage medium of claim 10, wherein causing the subtitle list to be modified comprises generating visual guidance based on the first change and the mapping, and generating a graphical user interface that includes the visual guidance.

19. A system, comprising:

a memory storing instructions; and a processor that is coupled to the memory and, when executing the instructions, is configured to:

compare a first version of a subtitle template and a second version of the subtitle template to identify a plurality of changes associated with an audiovisual program;

identify a first subtitle that is associated with a first change included in the plurality of changes, wherein the first subtitle is included in a subtitle list; and cause the subtitle list to be modified based on the first change and the first subtitle to generate an up-to-date subtitle list.

20. The system of claim 19, wherein the processor is further configured to:

compare a first version of the audiovisual program and a second version of the audiovisual program to determine one or more frame changes; and cause the first version of the subtitle template to be modified based on the one or more frame changes to generate the second version of the subtitle template.

* * * * *